United States Patent
Tojo (10) Patent No.: US 8,154,621 B2
(45) Date of Patent: Apr. 10, 2012

(54) PHOTOGRAPHING APPARATUS AND PHOTOGRAPHING METHOD

(75) Inventor: Takahiro Tojo, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/591,245

(22) Filed: Nov. 13, 2009

(65) Prior Publication Data

US 2010/0097500 A1 Apr. 22, 2010

Related U.S. Application Data

(63) Continuation of application No. 10/343,446, filed as application No. PCT/JP02/04639 on May 14, 2002, now abandoned.

(30) Foreign Application Priority Data

Jun. 26, 2001 (JP) .................................. 2001-193383

(51) Int. Cl.
*H04N 5/262* (2006.01)
*H04N 5/235* (2006.01)
*H04N 5/222* (2006.01)
*G03B 7/00* (2006.01)

(52) U.S. Cl. ..................... 348/229.1; 348/362; 348/370; 348/240.99

(58) Field of Classification Search .... 348/229.1–230.1, 348/300–301, 360–371, 221.1, 240.99, 240.1–240.3
See application file for complete search history.

(56) References Cited

U.S. PATENT DOCUMENTS

| | | | | |
|---|---|---|---|---|
| 4,621,906 A | * | 11/1986 | Hashimoto et al. | ........... 359/698 |
| 4,772,780 A | * | 9/1988 | Reed et al. | ................... 235/64.7 |
| 4,878,081 A | | 10/1989 | Kishida et al. | |
| 5,075,715 A | * | 12/1991 | Sakai | ........................... 396/108 |
| 5,150,144 A | * | 9/1992 | Soshi et al. | ..................... 396/76 |
| 5,231,447 A | | 7/1993 | Takagi | |

(Continued)

FOREIGN PATENT DOCUMENTS

| | | |
|---|---|---|
| JP | 56-17577 | 2/1981 |
| JP | 60-035717 | 2/1985 |

(Continued)

OTHER PUBLICATIONS

Communication from European Patent Office for Application No. 02780853.4 dated Sep. 28, 2005.

(Continued)

*Primary Examiner* — Nhan T Tran
*Assistant Examiner* — Tuan Le
(74) *Attorney, Agent, or Firm* — Rader, Fishman & Grauer PLLC (57) ABSTRACT

An image of a subject is focused on an image pickup device through a zoom lens and a diaphragm. The image focused on the image pickup device is photoelectrically converted into an electric signal. The electric signal as a picture signal is supplied to an amplifying circuit. The amplifying circuit amplifies the supplied picture signal. The amplified picture signal is digitized by an A/D converter. The digitized picture signal is supplied to a signal processing circuit. The signal processing circuit performs a clamping process, a color signal process, a luminance signal process, and other processes such as contour compensation, defect compensation, and white balance compensation. A camera CPU controls the zoom lens through a lens driving circuit, controls the image pickup device through a timing generating circuit, and controls an auxiliary lighting portion 7. A signal received from an operating portion is supplied to the camera CPU.

26 Claims, 7 Drawing Sheets

U.S. PATENT DOCUMENTS

| | | | | |
|---|---|---|---|---|
| 5,343,268 A * | 8/1994 | Takahashi | ........................ | 396/67 |
| 5,382,974 A * | 1/1995 | Soeda et al. | ................ | 348/221.1 |
| 5,610,654 A * | 3/1997 | Parulski et al. | ............. | 348/229.1 |
| 6,085,040 A * | 7/2000 | Yasukawa | ........................ | 396/61 |
| 6,133,983 A * | 10/2000 | Wheeler | ......................... | 355/40 |
| 6,535,692 B2 * | 3/2003 | Nakanishi et al. | ............. | 396/159 |
| 6,693,673 B1 * | 2/2004 | Tanaka et al. | ................. | 348/371 |
| 7,525,590 B2 * | 4/2009 | Murata et al. | ................. | 348/352 |
| 2001/0004271 A1 * | 6/2001 | Konishi | ........................ | 348/371 |

FOREIGN PATENT DOCUMENTS

| | | |
|---|---|---|
| JP | 2000-47297 | 2/2000 |
| JP | 2000-162679 | 6/2000 |

OTHER PUBLICATIONS

European Patent Communication Pursuant to Article 94(3) EPC issued on Nov. 28, 2012 for corresponding European Application No. 02 780 853.4.

* cited by examiner

PHOTOGRAPHING APPARATUS AND PHOTOGRAPHING METHOD

The present application is a Continuation Application of patent application Ser. No. 10/343,446, having a 371 date of Apr. 28, 2003, which is a 371 application of PCT/JP02/04639 filed on May 14, 2002, the entire contents being incorporated by reference. The present application claims priority based on Japanese Patent Application No. 2001-193383, filed on Jun. 26, 2001, the entirety of which being incorporated herein by reference.

BACKGROUND OF THE INVENTION

1. Field of Invention

The present invention relates to a photographing apparatus and a photographing method which allow a flash light photographable range to be kept almost constant in lighting photography (such as a flash light photography), even if a subject is photographed with a zoom lens of which a stop number of brightness (the amount of light which enters a photographing means) of the lens is varied correspondingly to the focal distance of the lens.

2. Description of Related Art

Currently, most of cameras are provided with a flash light as an auxiliary lighting means, so that a subject can be photographed with a flash light in a dark place. Many of cameras having a built-in flash light are provided with an automatic lighting function. Thus, with those cameras, everyone can easily photograph with a flash light.

However, since a flash light is built in the camera body, the amount of emitted light of the flash light is limited. In addition, the maximum emitted light amount, which is the so-called guide number (hereinafter abbreviated as GN) value, depends on the camera. The emitted light amount of the flash light is proportional to the GN value.

Flash light systems of most cameras have a light adjusting function. When the distance between a camera and a subject, namely, a focal distance, is in a flash light photographable range, the light adjusting function automatically adjusts the emitted light amount of the flash light so that the subject can be correctly exposed.

However, as the focal distance is apart from the flash light photographable range, the subject is gradually under-exposed, even with the maximum emitted light amount of the flash light.

When a camera is provided with a zoom lens of which the brightness (F number) of the lens is varied corresponding to the focal distance (namely, the F number of the lens is dropped (hereinafter, referred to as F drop)), the distance of which the subject is under-exposed at the focal distance (for example, wide end) of the brightest open F number is different from the distance of which the subject is under-exposed at the focal point (for example, tele end). As the F drop of the zoom lens is larger, the distance in which the subject is under-exposed becomes larger. When the subject is zoomed, the flash light photographable range is varied largely.

To solve such a problem, Japanese Patent Laid-Open Publication No. SHO 56-17577 discloses an invention in which when a zoom magnification becomes large, the diaphragm is not open with the minimum stop number F which is necessary for obtaining a predetermined depth of field.

In addition, Japanese Patent Laid-Open Publication No. SHO 60-3571.7 discloses an invention in which a driving portion is disposed at a member that is moved by a zooming operation, a cam portion is disposed at an operating portion to which a diaphragm lever with which a stop-down operation is performed is rotatably disposed, the driving portion and the cam portion are engaged when the driving portion is moved by the zooming operation, and the operating member is driven and thereby the diaphragm lever is deformed, so the fluctuation of the stop number due to the zooming operation can be compensated.

In addition, a technology of which the distance to a subject is measured and the effective sensitivity of an image pickup device is increased corresponding to the distance is known. In addition, Japanese Patent Laid-Open Publication No. 2000-162679 describes an invention in which auxiliary lighting compensates the insufficiency of the emitted light amount of main lighting so as to increase the effective sensitivity of the image pickup device.

However, since the relation between the focal distance and the exposure is not considered in flash light photography, when the zooming operation is performed, an F drop takes place. As a result, the brightness of the lens is varied. The emitted light amount of the flash light for correctly exposing the subject cannot be obtained depending on the focal distance. Thus, even if the subject is photographed with a zoom lens of which the brightness of the lens is varied depending on the focal distance, the flash light photographable range is varied largely.

Therefore, an object of the present invention is to provide a photographing apparatus and a photographing method which allow a flash light photographable range to be kept almost constant even if the brightness of a lens is varied due to an F drop when a zooming operation is performed.

BRIEF SUMMARY OF THE INVENTION

Disclosed is a photographing apparatus, comprising auxiliary lighting means for lighting a subject; photographing means for photographing the subject; a zoom lens portion for varying the amount of light entering into the photographing means corresponding to a focal distance of the zoom lens portion; and amplifying means for amplifying a picture signal that is output from the photographing means with an amplification factor that has been set, wherein when the subject is photographed with the auxiliary lighting means, a setting of the amplification factor of the amplifying means is changed corresponding to the focal distance.

Disclosed is a photographing method, comprising the steps of causing a lighting means to light a subject; causing a photographing means to photograph the subject; amplifying a picture signal of the photographed subject with an amplification factor that has been set because an amount of light which enters the photographing means of a zoom lens portion is varied corresponding to a focal distance of the zoom lens portion; and changing a setting of the amplification factor corresponding to the focal distance.

In such a manner, the subject is lit by the lighting means. When the subject is photographed by the photographing means, since the amount of light (brightness of the lens) which enters the photographing means is varied depending on the focal distance, the picture signal of the photographed subject is amplified with the amplification factor that has been set. At that point, the setting of the amplification factor is changed depending on the focal distance. Thus, even if the brightness of the zoom lens portion is varied, the photographable range can be kept almost constant.

DETAILED DESCRIPTION OF THE INVENTION

Figure 1:
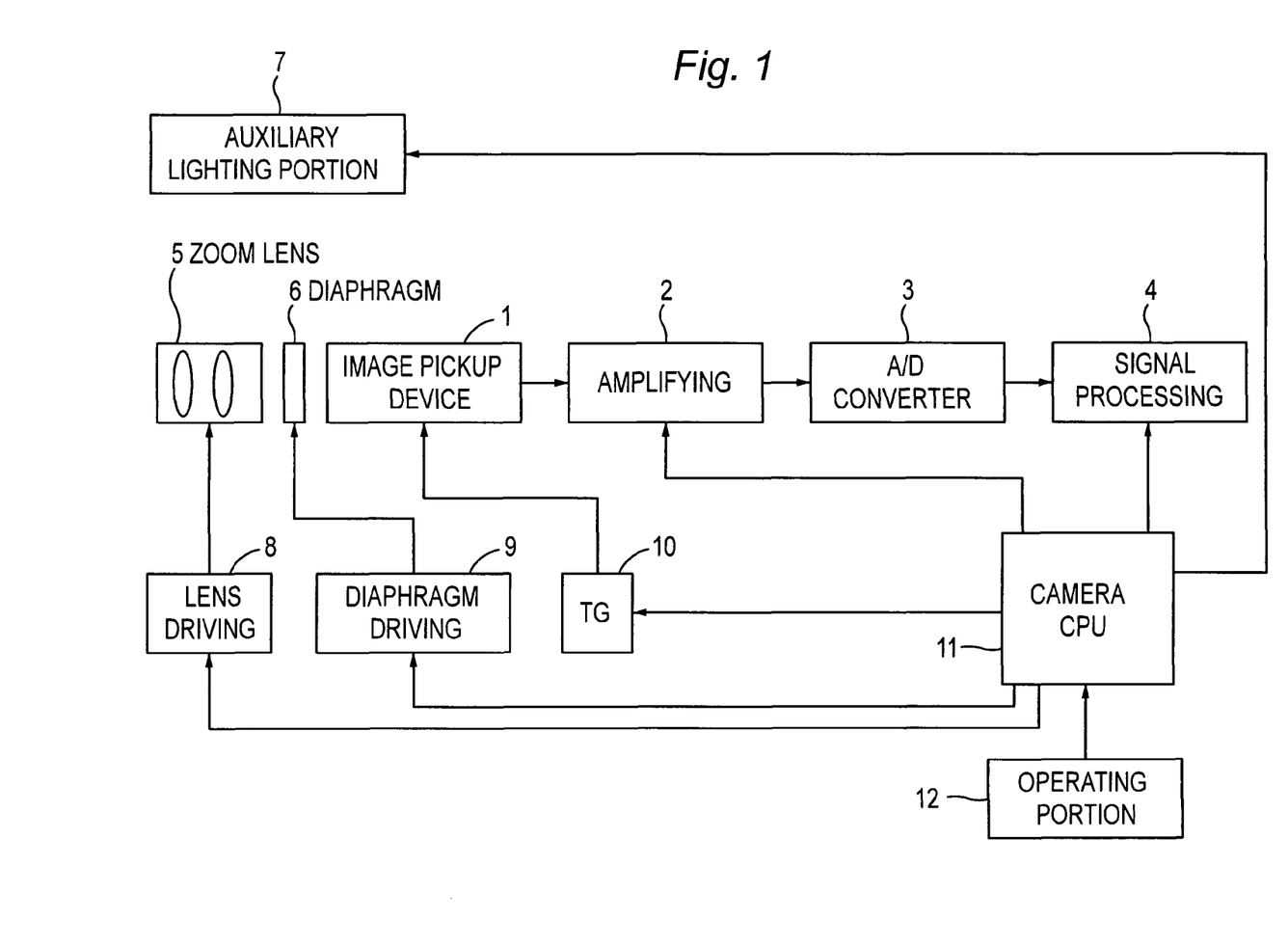
FIG. 1 is a block diagram showing an overall structure of a camera according to an embodiment of the present invention.

Next, with reference to the accompanying drawings, an embodiment of the present invention will be described. For preventing redundant descriptions, similar functional portions will be denoted by similar reference numerals in each of the accompanying drawings. FIG. 1 shows an overall structure of an embodiment of the present invention. An image of a subject is entered from the outside. The image is passed through a zoom lens 5 and a diaphragm 6 and then focused on an image pickup device 1. The image pickup device 1 is composed of, for example, a CCD (Charge Coupled Device). An image focused on the image pickup device 1 is photoelectrically converted into an electric signal. The electric signal is supplied as a picture signal to an amplifying circuit 2. The amplifying circuit 2 amplifies the supplied picture signal. As will be described later, an amplification factor of the amplifying circuit 2 is properly set. The picture signal amplified by the amplifying circuit 2 is supplied to an A/D converter 3. The A/D converter 3 digitizes the amplified picture signal. The digitized picture signal is supplied to a signal processing circuit 4. The signal processing circuit 4 performs a clamping process, a color signal process, a luminance signal process, and other processes such as contour compensation, defect compensation, and white balance compensation for the supplied picture signal.

The operations of those circuits are controlled by a camera CPU (Central Processing Unit) 11. For example, an automatic focus control of the zoom lens 5 is performed by the camera CPU 11 through a lens driving circuit 8. An automatic diaphragm control of the diaphragm 6 is performed by the camera CPU 11 through a diaphragm driving circuit 9. The image pickup device 1 is controlled by the camera CPU 11 through a timing generator 10. An auxiliary lighting portion 7 emits light for an amount (namely, adjusted-light amount) corresponding to a control signal supplied from the camera CPU 11 at a predetermined timing. In addition, a signal that is output from an operating portion 12 operated by the user is supplied to the camera CPU 1.1. The operating portion 12 is used to set, for example, the amplification factor of the amplifying circuit 2 for the picture signal, as will be described later.

When a subject is photographed with a flash light using the auxiliary lighting portion 7, to correctly expose the subject, it is necessary to satisfy the following relation (formula 1):

$$GN = F \cdot D \quad \text{(formula 1)}$$

where GN represents the GN value of the flash light; F represents the stop number; and D represents the distance to the subject.

For example, assuming that the stop number is F2.8 and the distance D to the subject is 2 m, when the subject is flash light photographed with an emitted light amount of which the GN value is 5.6, the subject is correctly exposed.

Figure 2:
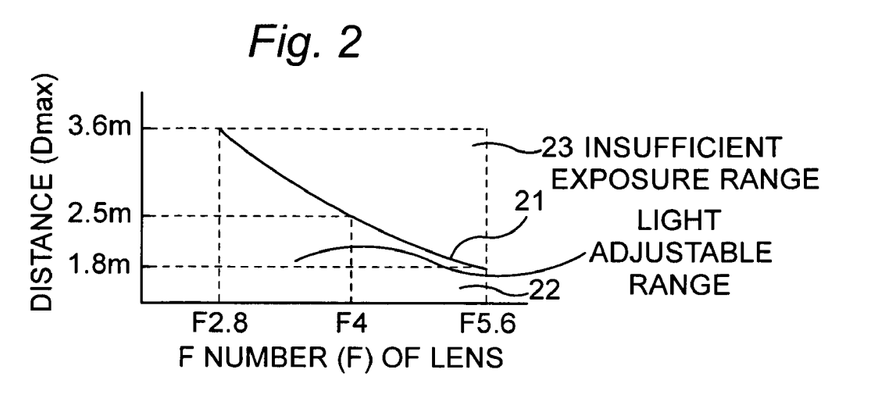
FIG. 2 is a characteristic diagram for explaining the relation between a stop number F of a lens and a distance D to a subject according to the present invention.

The relation between the stop number F and the distance D to the subject is denoted by line 21 in FIG. 2. In this case, it is assumed that the GN value of the auxiliary lighting portion 7 is 10. Assuming that the line 21 is a boundary line, an area denoted by reference numeral 22 is a flash light photographable range. An area denoted by reference numeral 23 is a flash light non-photographable range.

In contrast, when the subject is flash light photographed using a flash light in the condition that the GN value of auxiliary lighting portion 7 is 10 and the stop number is F2.8, the distance D to the subject becomes around 3.6 m. The range of around 3.6 m is the flash light photographable range. In other words, in the range of around 3.6 m, with the light adjusting function, the subject can be photographed with a correct exposure. However, when the distance D to the subject exceeds the flash light photographable range (around 3.6 m), the subject is under-exposed.

When the GN value of the auxiliary lighting portion 7 is 10 and the stop number is F5.6, the distance D to the subject becomes around 1.8 m. The range of around 1.8 m is the flash light photographable range. In the range of around 1.8 m, the subject always can be flash light photographed with a correct exposure by the light adjusting function.

The GN value of the auxiliary lighting portion 7 disposed in the camera body cannot sufficiently correspond to the variation of the stop number F due to the limitation of the size and power consumption of the auxiliary lighting portion 7. Now, it is assumed that the camera is provided with the auxiliary lighting portion 7 whose GN value is 10 and the zoom lens 5 of which the brightness of the lens varies from F2.8 at the wide end to F5.6 at the tele end as an F drop. When a subject is flash light photographed at the wide end by the camera with a distance of 3 m to the subject, it is correctly exposed. However, when the subject is zoomed, it is under exposed. At the tele end, unless the distance between the camera and the subject is decreased to around 1.8 m, the subject cannot be correctly exposed. In this case, although the subject has been zoomed in, it is necessary to cause the camera to further approach the subject.

From the view point of sensitivity, assuming that the image pickup device 1 outputs a picture signal based on, for example, ISO (International Organization for Standardization) speed 100, when a subject is zoomed, an F drop takes place. In this case, the sensitivity of a picture signal that is output from the image pickup device 1 is decreased for the decreased light. To compensate the decreased sensibility, the amplifying circuit 2 amplifies the picture signal with an amplification factor that has been set.

Figure 3A:
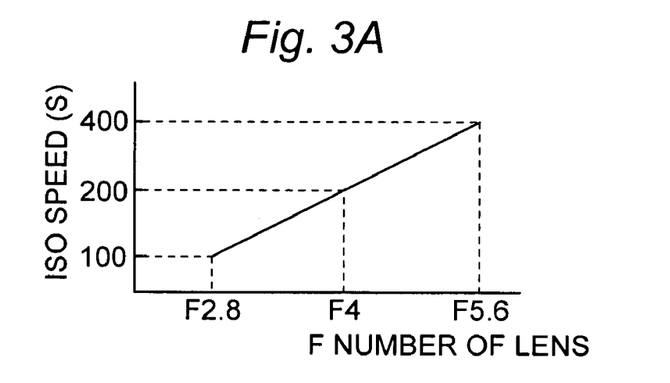
FIGS. 3A and 3B are a characteristic diagram for explaining the present invention.
Figure 3B:
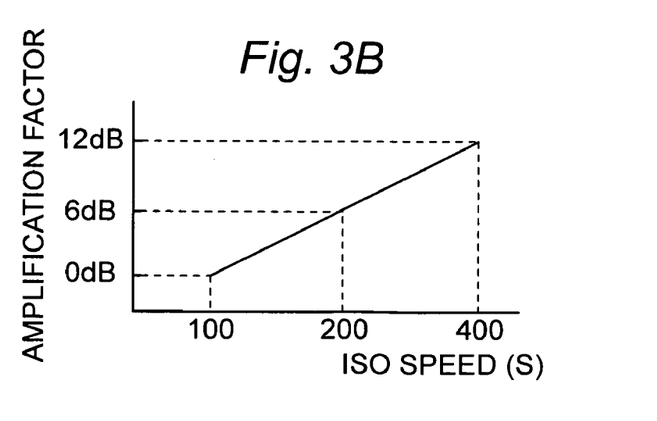

For example, as shown in FIG. 3A, when the stop number of the zoom lens 5 is F2.8, the image pickup device 1 outputs a picture signal of ISO speed 100. In this case, since the amplifying circuit 2 does not need to amplify the picture signal that is output from the image pickup device 1, as shown in FIG. 3B, the amplification factor is 0 dB.

In contrast, when the stop number of the zoom lens 5 is F4, to output a picture signal of ISO speed 100 at a stop number of F2.8 from the image pickup device 1, it is necessary to output a picture signal of ISO speed 200 from the image pickup device 1. Thus, the amplifying circuit 2 amplifies the picture signal that is output from the image pickup device 1 so that the picture signal becomes a signal of ISO speed 200. At that point, as shown in FIG. 3B, the amplification factor is 6 dB.

In addition, when the stop number of the zoom lens 5 is F5.6, to output a picture signal of ISO speed 100 at a stop number F2.8 from the image pickup device 1, it is necessary to output a picture signal of ISO speed 400 from the image pickup device 1. Thus, the amplifying circuit 2 amplifies the picture signal that is output from the image pickup device 1 so that the picture signal becomes a signal of ISO speed 400. At that point, as shown in FIG. 3B, the amplification factor is 12 dB.

The foregoing (formula 1) is based on ISO speed 100. When ISO speed S is considered, (formula 1) can be expressed with (formula 2).

$$GN \cdot \sqrt{(S/100)} = F \cdot d \quad \text{(Formula 2)}$$

where $\sqrt{(\ )}$ obtains the root of the calculated result in ( ).

Assuming that the ISO speed is 400, the GN value is 10, and the stop number is F5.6, the following relation can be obtained.

$$10 \cdot \sqrt{(400/100)} = 5.6 \cdot D$$

$$D \approx 3.57 \text{ (m)}$$

In other words, the flash light photographable range becomes around 3.6 m.

Figure 4:
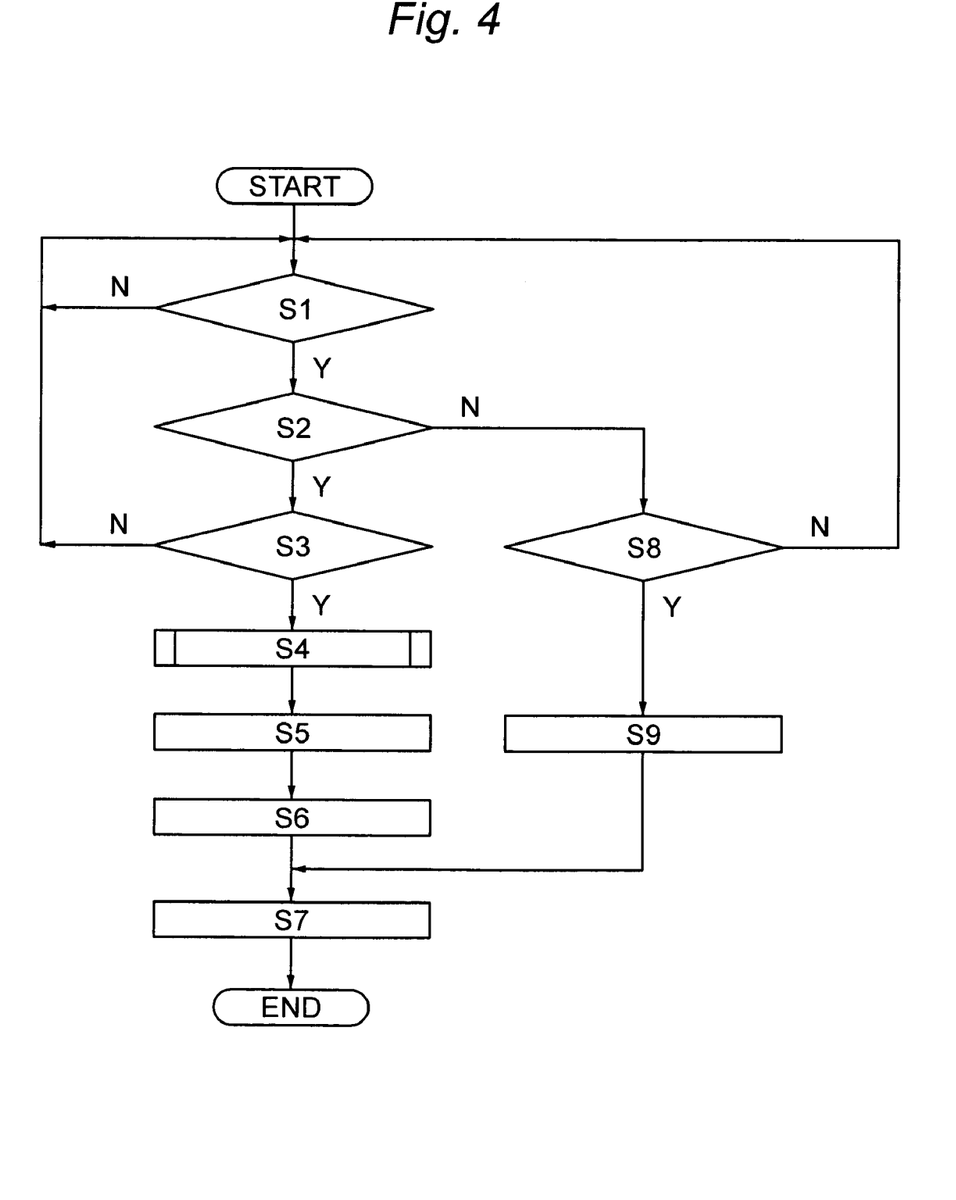
FIG. 4 is a flow chart for explaining a control according to an embodiment of the present invention.

Now, with reference to the flow chart shown in FIG. 4, an example of a control according to the embodiment will be described. At step S1, it is determined whether or not the shutter of the camera has been pressed halfway. When the determined result represents that the shutter has been pressed halfway, the flow advances to step S2. When the determined result represents that the shutter has not been pressed halfway, the flow cycles at step S1 until the shutter has been pressed halfway.

At step S2, it is determined whether or not flash light photography is performed. When the determined result represents that flash light photography is performed, the flow advances to step S3. When the determined result represents that flash light photography is not performed, the flow advances to step S8. At that point, the brightness around the camera may be automatically measured. Corresponding to the measured result, it may be determined whether or not flash light photography is set. Alternatively, flash light photography may be set by a user's operation:

At step S3, it is determined whether or not the shutter has been pressed deeply. When the determined result represents that the shutter has been pressed deeply, the flow advances to step S4. When the determined result represents that the shutter has not been pressed deeply, the flow returns to step S1.

At step S4, a subroutine, which will be described later, is called. In the subroutine, an amplification factor of the amplifying circuit 2 is set so that the decrease of the sensitivity of the image pickup device 1 due to an F drop is compensated. At step S5, the exposure of the image pickup device 1 is started. At step S6, the auxiliary lighting portion 7 emits light for a predetermined amount. At step S7, the exposure of the image pickup device 1 is finished. Thereafter, the control of the flow chart is finished.

When the determined result represents that flash light photography is not performed, the flow advances to step S8. At step S8, it is determined whether or not the shutter has been pressed deeply. When the determined result represents that the shutter has been pressed deeply, the flow advances to step S9. When the determined result represents that the shutter has not been pressed deeply, the flow returns to step S1. At step S9, the exposure of the image pickup device 1 is started. Thereafter, the flow advances to step S7.

Next, with reference to a flow chart shown in FIG. 5, a first example of an amplification factor setting control for compensating an F drop at step S4 will be described. The flow chart shown in FIG. 5 represents a subroutine that is called when the flow advances to step S4.

At step S11, the GN value of the auxiliary lighting portion 7 and the stop number Fmin at which the zoom lens 5 becomes the brightest are obtained. At step S12, the maximum distance Dmax is calculated by the foregoing (formula 1). In other words, the distance D calculated by GN=Fmin·D becomes the maximum distance Dmax.

At step S13, the current stop number F of the zoom lens is detected. At step S14, the ISO speed S is calculated by the foregoing (formula 2). In other words, the ISO speed S is calculated by GN·√(S/100)=F·Dmax. At step S15, an amplification factor corresponding to the calculated ISO speed S is set.

Figure 5:
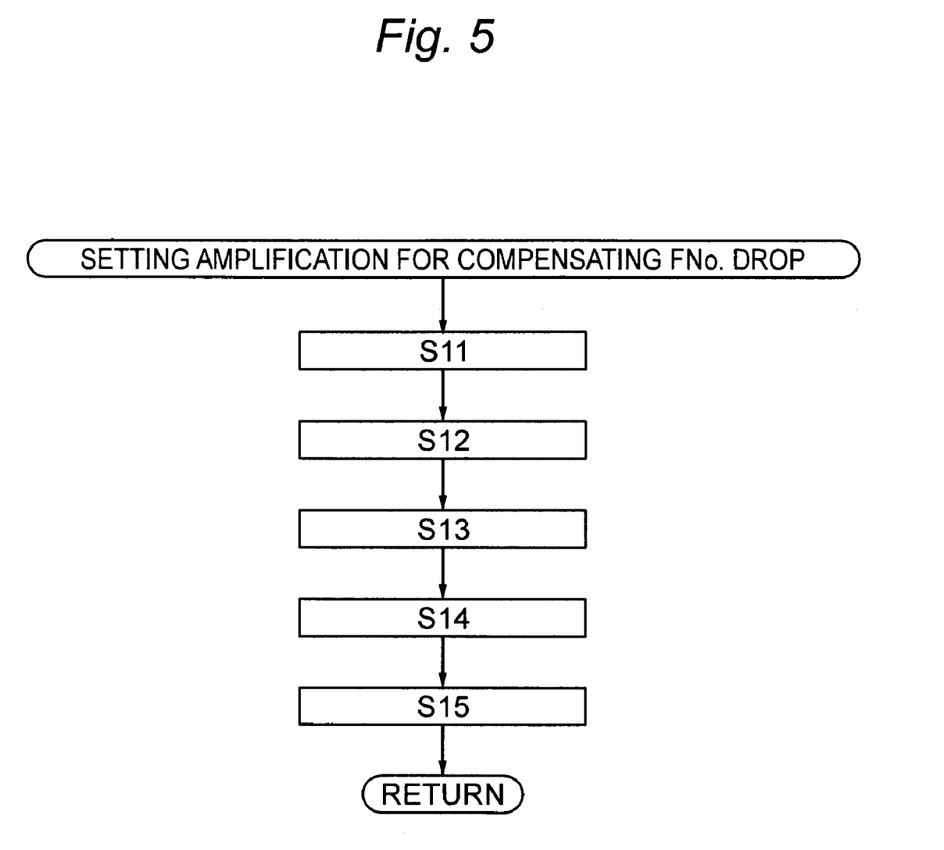
FIG. 5 is a flow chart showing a first example of an amplitude factor setting control for compensating an F drop according to the present invention.

After the subroutine of the flow chart shown in FIG. 5 is finished, the flow returns to step S4 at which the subroutine of the flow chart shown in FIG. 5 has been called.

Figure 6:
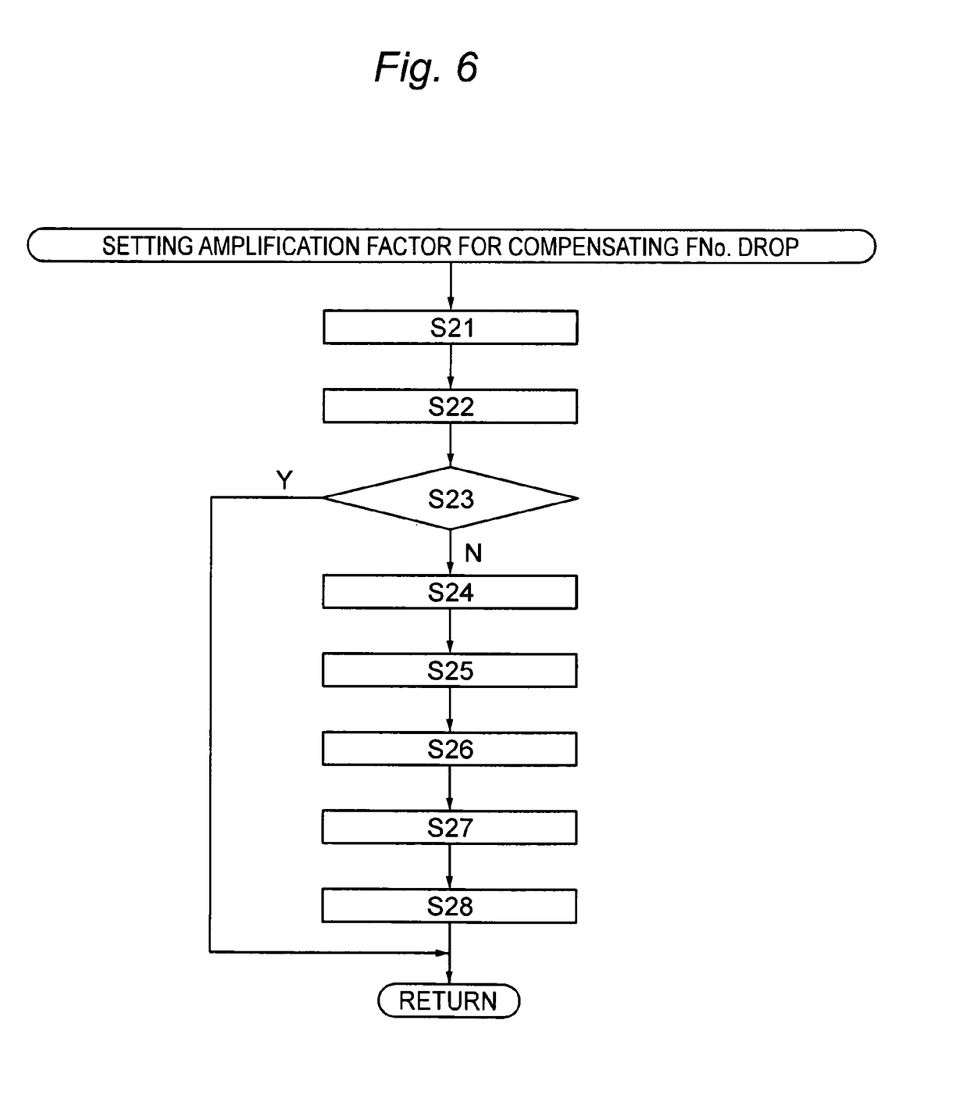
FIG. 6 is a flow chart showing a second example of an amplification factor setting control for compensating an F drop according to the present invention.

Next, with reference to the flow chart shown in FIG. 6, a second example of the amplification—factor setting control for compensating the F drop at step S4 will be described. The flow chart shown in FIG. 6 represents an example in which an amplification factor is set corresponding to the brightness. The flow chart shown in FIG. 6 represents a subroutine that is called when the flow advances to step S4.

At step S21, a reference value Eref with which brightness is compared is set. At step S22, the photometry means detects the brightness E around the camera. At step S23, it is determined whether or not the detected brightness E is higher than the reference value Eref. When the determined result represents that the detected brightness E is higher than the reference value Eref, the subroutine of the flow chart is finished. When the determined result represents that the detected brightness E is lower than the reference value Eref, the flow advances to step S24.

At step S24, the GN value of the auxiliary lighting portion 7 and the stop number Fmin at which the zoom lens 5 becomes the brightest are obtained. At step S25, with the obtained GN value and stop number Fmin, the maximum distance Dmax is calculated by the foregoing (formula 1). In other words, the maximum distance Dmax is calculated by GN=Fmin·Dmax.

At step S26, the current stop number F of the zoom lens 5 is detected. At step S27, the ISO speed S is calculated by the foregoing (formula 2). In other words, the ISO speed S is calculated by GN·√(S/100)=F·Dmax. At step S28, an amplification factor corresponding to the calculated ISO speed S is set.

When the subroutine of the flow chart shown in FIG. 6 is finished, the flow advances to step S4 at which the subroutine of the flow chart shown in FIG. 6 has been called. Thus, when the brightness E detected by the photometry means is higher than the reference value Eref, an amplification factor is not set.

Figure 7:
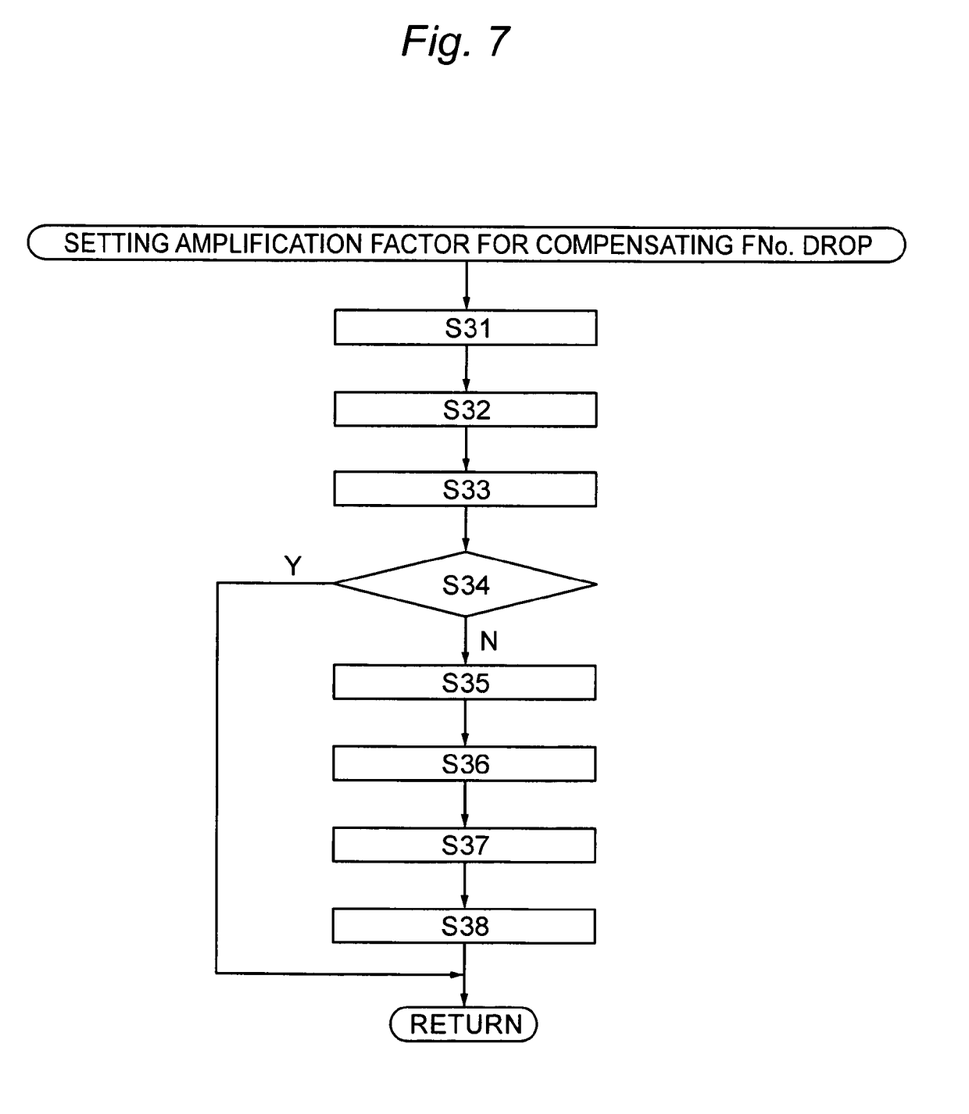
FIG. 7 is a flow chart showing a third example of an amplification factor setting control for compensating an F drop according to the present invention.

Next, with reference to the flow chart shown in FIG. 7, a third example of the amplification-factor setting control for compensating the F drop at step S4 will be described. The flow chart shown in FIG. 7 represents an example in which an amplification factor is set corresponding to the distance. The flow chart shown in FIG. 7 represents a subroutine that is called when the flow advances to step S4.

At step S31, the GN value of the auxiliary lighting portion 7 and the current stop number F of the zoom lens 5 are obtained. At step S32, with the obtained GN value and stop number F, the reference distance Dref is calculated by the foregoing (formula 1). In other words, the reference distance Dref is calculated by GN=F·Dref. At step S33, the distance d to the subject is detected by the distance measuring means.

At step S34, it is determined whether or not the subject is closer than the reference distance Dref. In other words, it is determined whether or not the distance D detected by the distance measuring means is equal to or smaller than the reference distance Dref. When the determined result represents that the detected distance D is equal to or smaller than the reference distance Dref, the subroutine of the flow chart is finished. When the determined result represents that the detected distance D is larger than the reference distance Dref, the flow advances to step S35.

At step S35, the stop number Fmin with which the zoom lens 5 becomes the brightest is obtained. At step S36, with the GN value obtained at step S31 and the stop number Fmin, the maximum distance Dmax is calculated by the foregoing (formula 1). In other words, the maximum distance Dmax is calculated by GN=Fmin·Dmax. At step S7, the ISO speed S is calculated by the foregoing (formula 2). In other words, the ISO speed S is calculated by GN·√(S/100)=F·Dmax. At step S38, an amplification factor corresponding to the calculated ISO speed S is set.

After the subroutine of the flow chart shown in FIG. 7 is finished, the flow returns to step S4 at which the subroutine of the flow chart shown in FIG. 7 has been called. Thus, when the distance D detected by the distance measuring means is equal to or smaller than the reference distance Dref, an amplification factor is not set.

When an amplification factor is set at step S4, one of the subroutines of the flow charts shown in FIGS. 5, 6, and 7 may be selected. When the brightness E detected by the photometry means is higher than the reference value Eref and when the distance D detected by the distance measuring means is equal to or smaller than the reference distance Dref, an amplification factor may not be set.

Figure 8A:
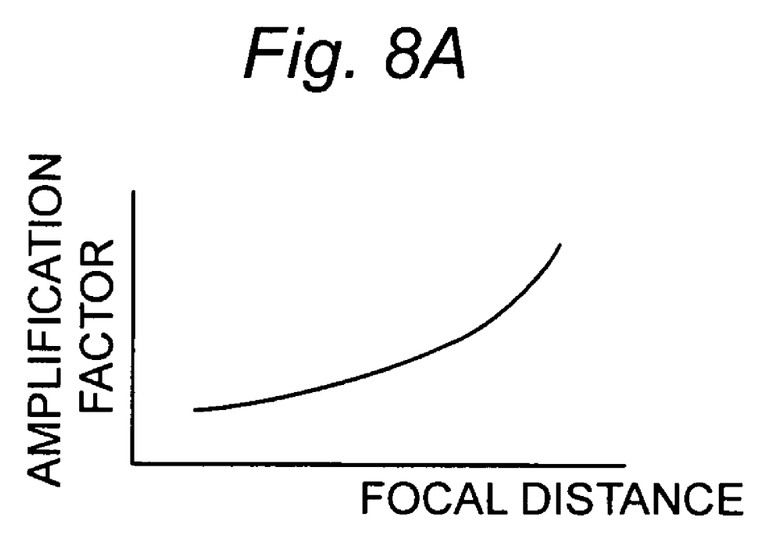
FIGS. 8A and 8B are a characteristic diagram showing an example of a variation of an amplification factor according to the present invention.
Figure 8B:
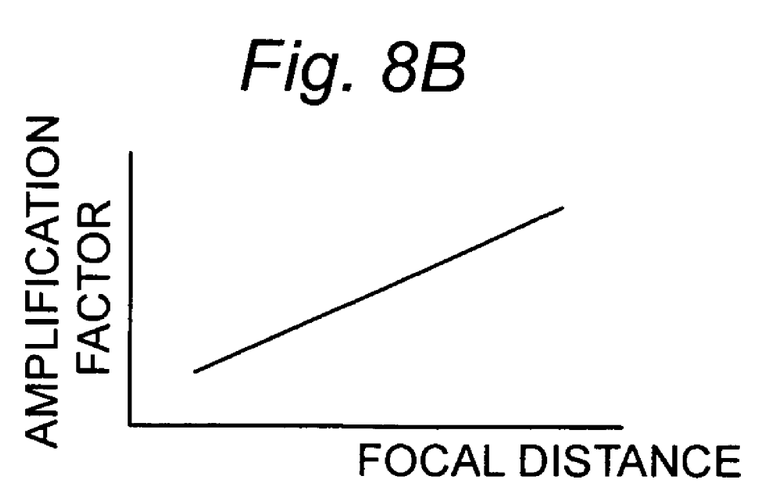

Now, the relation between the focal point and the amplification factor is shown in FIGS. 8A and 8B. As shown in FIG. 8A, the amplification factor may be increased in proportion to the focal distance. Alternatively, as shown in FIG. 8B, the amplification factor may be increased linearly corresponding to the focal distance. Alternatively, the amplification factor may be calculated by the foregoing (formula 2) whenever necessary. Alternatively, the amplification factor may be set stepwise or linearly in consideration of the balance with a real picture.

The relationship between the focal distance and the amplification factor may be preset at the factory before shipment. Alternatively, the relationship may be set freely by the user. When the user sets the relationship, he or she may set it in a menu format with the operating portion 12.

Now, it is assumed that the effective sensitivity of the image pickup device 1 is ISO speed 100 and the zoom lens 5 has a stop number in the range from F2.8 to F5.6. In this case, the amplification factor of the amplifying circuit 2 is set so that when the stop number becomes F5.6 as the result of the zooming operation, the effective sensitivity of the image pickup device 1 becomes equivalent to ISO speed 400. Consequently, a photographing distance at which the stop number is F2.8 is in the flash light photographable range without the need to approach the subject. In other words, the amount of light decreased due to the F drop can be compensated by varying the amplification factor.

However, if the amplification factor is increased corresponding to the amount of light that is decreased in proportion to the focal distance, since the noise component also is amplified, the quality of the supplied picture is deteriorated. Thus, it is important to balance the picture quality and correct exposure, and not simply set the amplification factor corresponding to the focal distance. The upper limit of the amplification factor to be set may be up to, for example, ISO speed 200.

When a subject is flash light photographed in a dark place, no problem takes place. In contrast, when a subject is flash light photographed in a bright room or in a sun-lit place (namely, daylight-synchronized flash photography is performed), if the amplification factor is thoughtlessly increased, stationary light also is amplified. As a result, the subject may be over-exposed. In this case, corresponding to information of which the brightness of the subject has been measured, a proper amplification factor may be set by determining whether to increase the amplification factor.

Even if an F drop takes place, when the distance is close to the subject and the light amount is sufficient, it is not necessary to increase the amplification factor. Thus, corresponding to information of which the distance to the subject has been measured, the amplification factor may be properly set.

According to the embodiment, the auxiliary lighting portion 7 is disposed in the camera. Alternatively, the auxiliary lighting portion 7 may be separated from the camera body.

According to the embodiment, the zoom lens 5 is disposed in the camera. Alternatively, the zoom lens 5 may be detachable from the camera body.

According to the present invention, when a subject is flash light photographed with auxiliary lighting, an F drop of the zoom lens causes the amount of light which enters the image pickup device to be decreased. However, by varying the amplification factor, the decrease of the light amount can be compensated. Thus, even if the brightness of the lens is varied by the zooming operation, the flash light photographable range can be kept almost constant.

According to the present invention, when a subject which is bright or which is at a close-up position is flash light photographed with auxiliary lighting, an amplification factor with which a picture signal supplied from the image pickup device is amplified can be properly set regardless of the F drop of the zoom lens. Thus, overexposure and noise occurrence can be suppressed.

Description of Reference Numerals

1 IMAGE PICKUP DEVICE
2 AMPLIFYING CIRCUIT
3 A/D CONVERTER
4 SIGNAL PROCESSING CIRCUIT
5 ZOOM LENS
6 DIAPHRAGM
7 AUXILIARY LIGHTING PORTION
8 LENS DRIVING CIRCUIT
9 DIAPHRAGM DRIVING CIRCUIT
10 TIMING GENERATING CIRCUIT
11 CAMERA CPU
12 OPERATING PORTION
S1 HAS SHUTTER BEEN PRESSED HALFWAY ?
S2 IS SUBJECT FLASH PHOTOGRAPHED ?
S3 HAS SHUTTER BEEN PRESSED DEEPLY ?
S4 SET AMPLIFICATION FACTOR FOR COMPENSATING FNo. DROP
S5 START EXPOSURE
S6 EMIT LIGHT
S7 FINISH EXPOSURE
S8 HAS SHUTTER BEEN PRESSED DEEPLY ?
S9 START EXPOSURE

S11 MINIMUM F NUMBER (Fmin) OF GUIDE NUMBER (GN)
S12 DISTANCE (Dmax) CALCULATED BY GN=Fmin·D
S13 F NUMBER (F) OF LENS
S14 ISO SPEED (S) CALCULATED BY GN·√(S/100)=F·Dmax
S15 SET AMPLIFICATION FACTOR CORRESPONDING TO ISO SEED (S)
S21 REFERENCE VALUE (Eref) OF BRIGHTNESS TO BE COMPARED
S22 BRIGHTNESS (E) OBTAINED BY PHOTOMETRY MEANS
S23 IS (E) BRIGHTER THAN (Eref) ?
S24 MINIMUM F NUMBER (Fmin) OF LENS WITH GUIDE NUMBER (GN)
S25 DISTANCE (Dmax) CALCULATED BY GN=Fmin·D
S26 F NUMBER OF LENS
S27 ISO SPEED (S) CALCULATED BY GN·√(S/100)=F·Dmax
S28 SET AMPLIFICATION FACTOR CORRESPONDING TO ISO SPEED (S)
S31 F NUMBER OF LENS WITH GUIDE NUMBER (GN)
S32 DISTANCE (Dref) CALCULATED BY GN=F·Dref
S33 DISTANCE (D) OBTAINED BY DISTANCE MEASURING MEANS
S34 Dref≧D?
S35 MINIMUM F NUMBER (Fmin) OF LENS
S36 ISO SPEED (S) CALCULATED BY GN·√(S/100)=F·Dmax
S37 SET AMPLIFICATION FACTOR CORRESPONDING TO ISO SPEED (S)

The invention claimed is:

1. A photographing method comprising:
setting an amplification factor to an updated amplification factor, a ratio of current and minimum F-numbers of a lens being used in setting said amplification factor, and thereafter;
amplifying an electric signal by said updated amplification factor, an image pickup device converting received light into said electric signal,
wherein a stop number of the lens is presently set at said current F-number, said received light in said lens being brightest at said minimum F-number,
wherein said ratio is:

$$\left( \frac{\text{said current F-number}}{\text{said minimum F-number}} \right).$$

2. The photographing method as set forth in claim 1, wherein said amplification factor is set only when illumination light from an auxiliary lighting portion is to be emitted.

3. The photographing method as set forth in claim 2, wherein an amount of said illumination light emissible from said auxiliary lighting portion is controllable.

4. The photographing method as set forth in claim 2, wherein a guide number of the auxiliary lighting portion is used in calculating a maximum distance from said lens to a subject, said maximum distance being used in setting said amplification factor.

5. The photographing method as set forth in claim 4, wherein a formula is used in calculating said maximum distance, said formula being:

$$\text{said maximum distance} = \frac{\text{said guide number}}{\text{said minimum F-number}}.$$

6. The photographing method as set forth in claim 1, wherein said amplification factor corresponds to a sensitivity, said minimum and current F-numbers being used in calculating said sensitivity.

7. The photographing method as set forth in claim 6, wherein a formula is used in calculating said sensitivity, said formula being:

$$\text{said sensitivity} = 100 \times \left( \frac{\text{said current F-number}}{\text{said minimum F-number}} \right)^2.$$

8. The photographing method as set forth in claim 1, wherein a camera includes said lens, said amplification factor being set only after brightness around the camera has been determined to be lower than a reference value.

9. The photographing method as set forth in claim 1, wherein said amplification factor is set only after a distance to a subject has been determined to be higher than a reference distance.

10. The photographing method as set forth in claim 1, wherein said amplification factor is in proportion to a focal distance of the lens.

11. The photographing method as set forth in claim 10, wherein said lens varies an amount of light focused onto said image pickup device, said amount corresponding to said focal distance of the lens.

12. The photographing method as set forth in claim 1, wherein said electric signal after amplification is digitized, said electric signal after amplification and digitization becoming a digitized picture signal.

13. The photographing method as set forth in claim 12, wherein a signal processing performed on said digitized picture signal is from the group consisting of a clamping process, a color signal process, a luminance signal process, a contour compensation, a defect compensation, and a white balance compensation.

14. A photographing apparatus comprising:
a lens configured to focus received light onto an image pickup device, a stop number of said lens being settable to one of a plurality of F-numbers;
an operating portion configured to set an amplification factor to an updated amplification factor, a ratio of current and minimum ones of the F-numbers being used in setting said amplification factor;
an amplifying circuit configured to amplify an electric signal by said updated amplification factor, said image pickup device being configured to convert said received light into said electric signal,
wherein said lens is presently set at said current one of the F-numbers, said received light in said lens being brightest at said minimum one of the F-numbers,
wherein said ratio is:

$$\left( \frac{\text{said current one of the F-numbers}}{\text{said minimum one of the F-numbers}} \right).$$

15. The photographing apparatus as set forth in claim 14, wherein an amount of the received light focused onto said image pickup device corresponds to a focal distance of the lens.

16. The photographing apparatus as set forth in claim 14, wherein said operating portion is configured to set said amplification factor only when illumination light from an auxiliary lighting portion is to be emitted.

17. The photographing apparatus as set forth in claim 16, wherein a processing unit is configured to control an amount of said illumination light emissible from said auxiliary lighting portion.

18. The photographing apparatus as set forth in claim 16, wherein a guide number of the auxiliary lighting portion is used in calculating a maximum distance from said lens to a subject, said maximum distance being used in setting said amplification factor.

19. The photographing apparatus as set forth in claim 18, wherein a formula is used in calculating said maximum distance, said formula being:

$$\text{said maximum distance} = \frac{\text{said guide number}}{\text{said minimum ones of the F-numbers}}.$$

20. The photographing apparatus as set forth in claim 14, wherein said updated amplification factor corresponds to a sensitivity, said minimum and current ones of the F-numbers being used in calculating said sensitivity.

21. The photographing apparatus as set forth in claim 20, wherein a formula is used in calculating said sensitivity, said formula being:

$$\text{said sensitivity} = 100 \times \left( \frac{\text{said current one of the F-numbers}}{\text{said minimum one of the F-numbers}} \right)^2.$$

22. The photographing apparatus as set forth in claim 14, wherein a camera includes said lens, said operating portion is configured to set said amplification factor only after brightness around the camera has been determined to be lower than a reference value.

23. The photographing apparatus as set forth in claim 14, wherein said operating portion is configured to set said amplification factor only after a distance to a subject has been determined to be higher than a reference distance.

24. The photographing apparatus as set forth in claim 14, wherein said updated amplification factor is in proportion to a focal distance of the lens.

25. The photographing apparatus as set forth in claim 14, wherein said lens is detachable from a camera body.

26. The photographing apparatus as set forth in claim 14, wherein a focal distance of said lens is variable.

* * * * *